May 17, 1927.
L. W. WOLFSON
1,629,060
WEATHERPROOF ANTITHEFT ATTACHMENT FOR MOTOR VEHICLES
Filed Sept. 16, 1926　　2 Sheets-Sheet 1
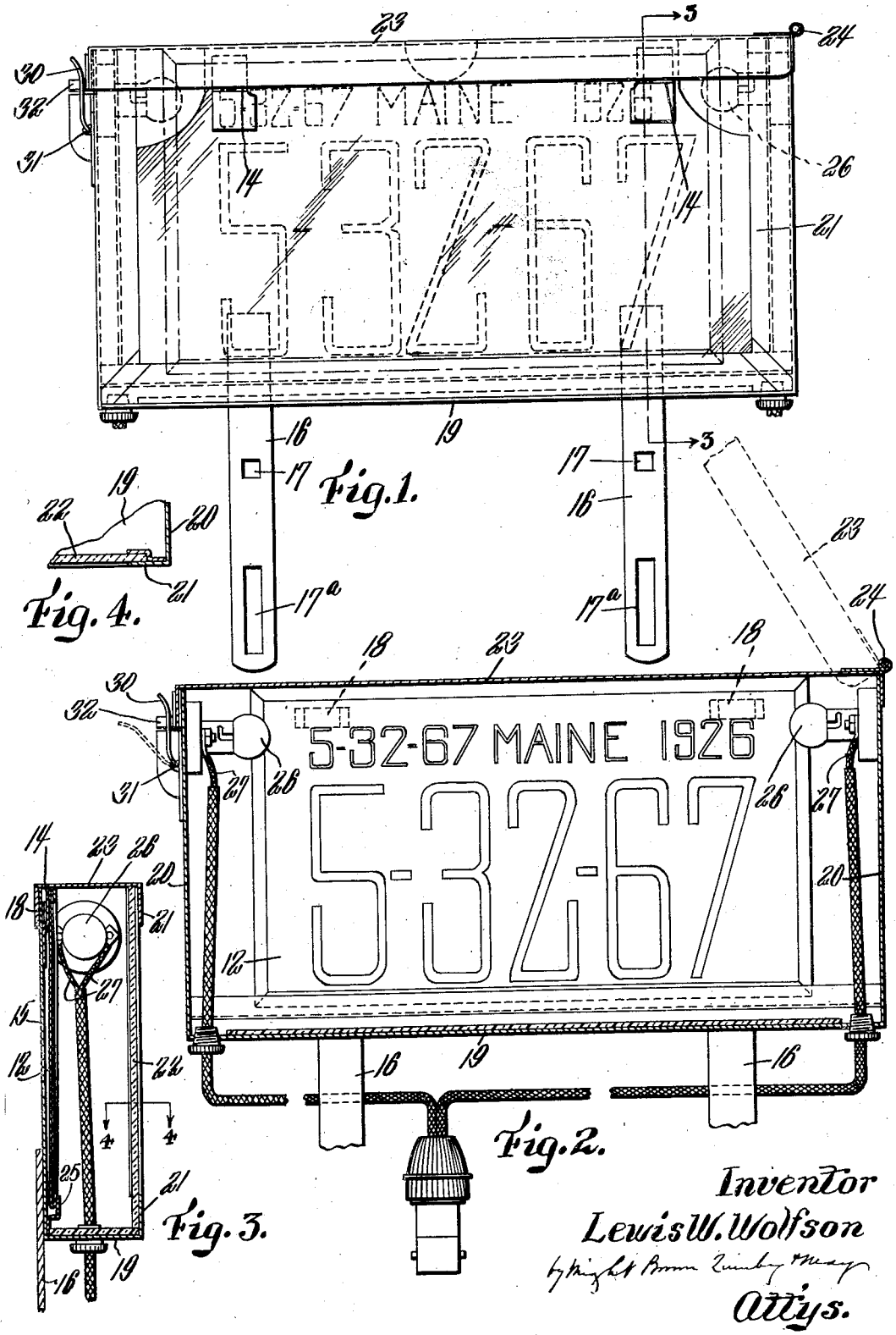
Inventor
Lewis W. Wolfson
by Wright Brown Quinby May
attys.

May 17, 1927.
L. W. WOLFSON
1,629,060
WEATHERPROOF ANTITHEFT ATTACHMENT FOR MOTOR VEHICLES
Filed Sept. 16, 1926  2 Sheets-Sheet 2
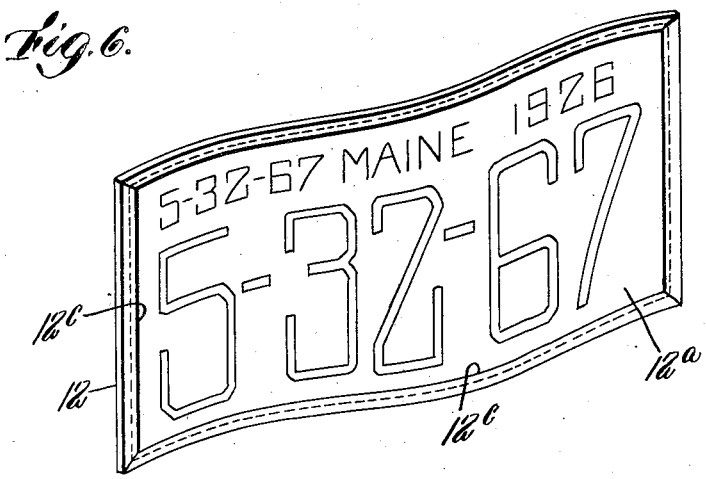
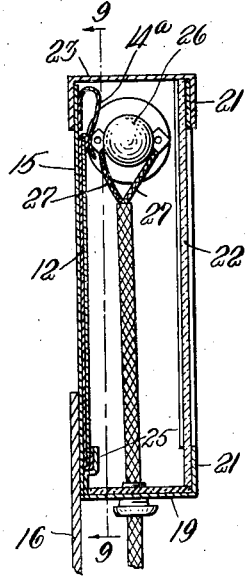
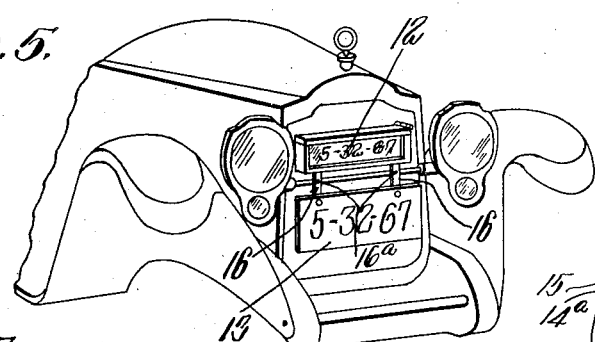
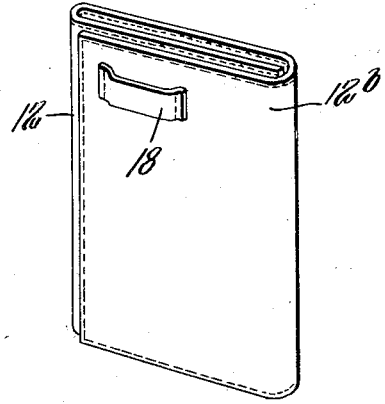
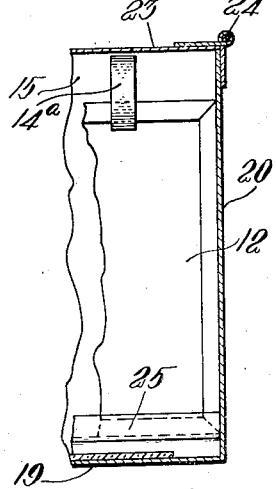
Inventor
Lewis W. Wolfson
by Wright Brown Quinby & Hay
Attys.

Patented May 17, 1927.

1,629,060

UNITED STATES PATENT OFFICE.

LEWIS W. WOLFSON, OF BOSTON, MASSACHUSETTS.

WEATHERPROOF ANTITHEFT ATTACHMENT FOR MOTOR VEHICLES.

Application filed September 16, 1926. Serial No. 135,979.

This invention relates to means whereby the owner of a motor vehicle, when parking the same, is enabled to so condition the vehicle that its subsequent unauthorized use will arouse suspicion in the minds of police officers and others, and be liable to lead to investigation, said means including a secondary flexible and foldable license plate, mounted on the vehicle immediately adjacent the usual license plate required by law, (which may be called the primary license plate), so that the two plates are simultaneously visible when the vehicle is in authorized use, the secondary plate being quickly removable by the owner and carried in his pocket when the vehicle is parked, so that the vehicle is conditioned to render questionable its subsequent use, without the secondary plate.

The object of the invention is to permit the long-continued use of the secondary plate without contamination by mud and dirt and without becoming wet, so that it may be pocketed without contaminating and wetting the garment, and its quick installation in and removal from its operative position, so that the owner may, without objectionable loss of time, remove and install the secondary plate as many times a day as occasion may require.

Of the accompanying drawings forming a part of this specification,

Figure 1 is a side view of an attachment embodying the invention.

Figure 2 shows the casing element of the attachment in longitudinal vertical section, and the secondary license plate in elevation.

Figure 3 is a section on line 3—3 of Figure 1.

Figure 4 is a fragmentary horizontal section on line 4—4 of Figure 3.

Figure 5 is a fragmentary perspective view, showing the forward end portion of a motor vehicle and an attachment embodying the invention attached thereto, in close proximity to a primary license plate.

Figure 6 is a perspective view of the secondary license plate, showing the same curved to indicate flexibility.

Figure 7 shows the secondary plate folded for insertion in a pocket.

Figure 8 is a view similar to Figure 3, showing alternative means for maintaining the secondary plate in a flattened condition in the casing.

Figure 9 is a fragmentary section on line 9—9 of Figure 8.

The same reference characters indicate the same parts in all of the figures.

My improved attachment includes a secondary license plate 12, bearing license indicia which is a duplicate of that borne by a primary fixed license plate 13, required by State regulations to be carried by a licensed motor vehicle. The secondary plate is foldable, as shown by Figure 7, so that it may be conveniently carried in the owner's pocket. In this instance, the secondary plate includes a front layer 12$^a$ bearing the license indicia, and a back layer 12$^b$ having edge portions 12$^c$ folded over the margin of the front layer and stitched thereto. The front layer may be made of cloth, and the back layer of leather, but other materials may be employed, if desired.

The attachment includes also a weatherproof casing, adapted to be opened and closed and having a sight opening at its front side and a transparent cover therefor, the casing being attachable to the vehicle, and formed to contain the secondary plate, and permit it to be viewed in a flattened condition through the sight opening, the casing being constructed to protect the secondary plate so that the latter is maintained in suitable condition for insertion in a garment pocket without liability of contaminating and wetting the garment when removed and folded.

In this instance, the casing includes a back plate or member 15, a bottom member 19, and members 20, a frame-shaped front member 21, forming the sight opening, a transparent glass member 22, closing the sight opening against the admission of mud, dust, rain and snow therethrough, an elongated opening formed to permit the passage through it of the secondary plate in an unfolded condition, and a displaceable cover 23 for said opening, connected by a hinge 24 with one of the end members 20. When the cover is displaced, as indicated by dotted lines in Figure 2, the secondary plate 12 may be inserted in the casing, in position to be seen through the sight opening.

The cover is formed so that when closed, it excludes dust, rain and snow from the casing. The casing is provided internally with means for quickly engaging the secondary plate 12, and holding it in a flattened condition. The means for this purpose, shown by Figures 1 and 2, includes members formed as upstanding ears 14, fixed to the upper portions of the back member 15, and adapted to engage sockets on the upper portion of the secondary plate, formed in this instance, by straps 18 (Figures 2, 3 and 7) attached to the back layer of the secondary plate, and adapted to be moved downward into engagement with the ears 14, and upward out of engagement therewith. Said means may also include a member formed as a flange 25, fixed to the back member and offset to bear on the lower edge and one side of the secondary plate.

In the alternative means shown by Figures 8 and 9, for holding the secondary plate flattened, spring clips 14ᵃ are substituted for the ears 14, these clips being fixed to the back member 15 and adapted to bear yieldingly on the secondary plate, and confine its upper edge against the back member, the pockets 18 being omitted.

Each of the described embodiments includes securing means permitting a quick location and confinement of the unfolded secondary plate in the casing, in position to be seen through the transparent casing portion provided by the glass member 22, and a quick removal of the plate through the opening closed by the cover 23.

The members of the described securing means are engageable with the upper and lower edge portions of the unfolded secondary plate, without engaging the intermediate portion thereof, as shown by Figures 3 and 8. The plate, although foldable, has sufficient inherent stiffness to maintain it in a flat condition, when its upper and lower edge portions are engaged by said members.

The attachment may be secured to the vehicle by downwardly projecting shanks 16, fixed to the back member 15 and having bolt or screw-receiving holes 17, adapted to receive bolts or screws 16ᵃ attaching the shanks to a fixed rod at the front end of the radiator, as shown by Figure 5. The shanks 16 may be provided with slots 17ᵃ to receive fastening members securing the primary license plate 13 to the shanks.

To reduce to a minimum the time required to remove and install the secondary plate, I so arrange the means for attaching the casing to its support, that when the casing is attached, the opening and the cover 23 are at the top, and the transparent portion is at the front side of the casing, so that the unfolded secondary plate may be moved vertically edgewise into and out of the casing, the secondary-plate-securing means being adapted to quickly confine the plate in a displayed position, when it is moved edgewise into the casing, and permit a quick removal of the plate from its displayed position. The arrangement permitting a vertical edgewise movement of the plate enables the owner, when standing at the front of the vehicle, to quickly obtain access to the secondary plate, and move it to and from its displayed position.

The duplicate plate may be illuminated by electric lamps 26, within the casing, supplied with current through conductors 27, extending from the casing to a source of electric energy on the vehicle, a suitable switch controlled by the driver being provided to light and extinguish the lamps.

The cover 23 may be confined in its closed position by any suitable means, such as a swinging hasp 30, pivoted at 31 to the casing and adapted to engage an ear 32, fixed to an end member 20 of the cover. If desired, means may be provided for locking the cover in its closed position.

The casing and the secondary license plate may be larger in proportion to the primary license plate than as shown by Figure 5, so that the enlarged secondary license plate may be utilized to display advertising matter placed thereon.

I claim:

1. An anti-theft accessory for a licensed motor vehicle, comprising, in combination, a flexible license plate substantially duplicating in size and indicia the usual license plate of the vehicle, and foldable to permit storage in a garment pocket, a weatherproof casing having an opening formed to receive the flexible plate in an unfolded condition, means being provided within the casing for releasably confining the flexible plate therein in an unfolded flat condition, the casing including a transparent front wall formed to permit inspection of the confined plate; and means for attaching the casing to a portion of the vehicle adjacent the usual license plate thereof, in position permitting simultaneous inspection of the two plates, the flexible plate being protected by the casing from contamination when in use.

2. An anti-theft accessory for a licensed motor vehicle, comprising, in combination, a flexible license plate substantially duplicating in size and indicia the usual license plate of the vehicle, and foldable to permit storage in a garment pocket, a weatherproof casing having an opening formed to receive the flexible plate in an unfolded flat condition, the casing including a flat back wall, formed as a backing for the flexible plate, and a transparent front wall formed to permit inspection of the flexible plate, means being provided for releasably confining the flexible plate flattened on the back wall; and means for attaching the casing to a portion of the vehicle adjacent the usual license plate thereof, in position permitting simultaneous inspection of the two plates, the flexible plate being protected by the casing from contamination when in use.

3. An anti-theft accessory for a licensed motor vehicle, comprising, in combination, a flexible license plate substantially duplicating in size and indicia the usual license plate of the vehicle, and foldable to permit storage in a garment pocket, a weatherproof casing having an opening formed to receive the flexible plate in an unfolded condition, a back wall, means being provided for releasably confining the flexible plate flattened against the back wall, and a transparent front wall formed to permit inspection of the confined plate; and means for attaching the casing to a portion of the vehicle adjacent the usual license plate thereof, in position permitting simultaneous inspection of the two plates, said means including shanks fixed to the back member and projecting downward therefrom, and fasteners attaching said shanks to a primary license plate supporting member at the front end of the vehicle radiator, the flexible plate being protected by the casing from contamination when in use.

4. An anti-theft accessory for a licensed motor vehicle, comprising, in combination, a flexible license plate substantially duplicating in size and indicia the usual license plate of the vehicle, and foldable to permit storage in a garment pocket, the plate having ear-engaging straps on its back, a weatherproof casing having an opening formed to receive the flexible plate in an unfolded flat condition, the casing including a flat back wall formed as a backing for the flexible plate, and provided with upstanding ears engageable with the said straps by the insertion of the flexible plate in the casing, to confine the plate flattened on the back wall, said casing including also a transparent front wall formed to permit inspection of the flexible plate, and means for attaching the casing to a portion of the vehicle adjacent the usual license plate thereof, in position permitting simultaneous inspection of the two plates, the flexible plate being protected by the casing from contamination when in use.

In testimony whereof I have affixed my signature.

LEWIS W. WOLFSON.